US010269160B2

(12) United States Patent
Ma et al.

(10) Patent No.: US 10,269,160 B2
(45) Date of Patent: Apr. 23, 2019

(54) METHOD AND APPARATUS FOR PROCESSING IMAGE

(71) Applicant: Tencent Technology (Shenzhen) Company Limited, Shenzhen, Guangdong (CN)

(72) Inventors: Liang Ma, Shenzhen (CN); Chunhua Luo, Shenzhen (CN); Zhiqiang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 34 days.

(21) Appl. No.: 15/715,918

(22) Filed: Sep. 26, 2017

(65) Prior Publication Data

US 2018/0033179 A1 Feb. 1, 2018

Related U.S. Application Data

(63) Continuation of application No. 14/967,924, filed on Dec. 14, 2015, now Pat. No. 9,805,488, which is a
(Continued)

(30) Foreign Application Priority Data

Aug. 28, 2013 (CN) .......................... 2013 1 0381797

(51) Int. Cl.
*G06T 11/60* (2006.01)
*G06T 5/00* (2006.01)
(Continued)

(52) U.S. Cl.
CPC ................ *G06T 11/60* (2013.01); *G06T 3/40* (2013.01); *G06T 5/002* (2013.01); *G06T 5/50* (2013.01); *G06T 2207/20221* (2013.01)

(58) Field of Classification Search
CPC ....................................................... G06T 11/60
See application file for complete search history.

(56) References Cited

U.S. PATENT DOCUMENTS 4,281,049 A * 7/1981 Moraw .................... G03C 7/00
430/148
4,897,802 A * 1/1990 Atkinson ................ G09F 11/00
40/362
(Continued)

FOREIGN PATENT DOCUMENTS

| CN | 1229964 A | 9/1999 |
| CN | 1287646 A | 3/2001 |

(Continued)

OTHER PUBLICATIONS

English Abstract of "Opengl (Accumulation Buffer)," printed from the internet at <http://www.cnblogs.com/lizhengjin/archive/2010/09/27/1837204>, 2010, 13 pages.
(Continued)

*Primary Examiner* — Thomas J Lett
(74) *Attorney, Agent, or Firm* — Brinks Gilson & Lione

(57) ABSTRACT

The present disclosure discloses a method and an apparatus for processing an image. The method includes: acquiring a first original image to be processed and creating a preset number copies of the first original image which the preset number copies and the first original image have a same image but different transparencies; offsetting content of each copy of the preset number copies of the first original image to obtain the preset number copies of first processed images; and overlaying the first original image and the preset number copies of the first processed images, and getting an overlaid first original image as a result of the first original image.

18 Claims, 9 Drawing Sheets

Related U.S. Application Data continuation of application No. PCT/CN2014/080511, filed on Jun. 23, 2014.

(51) Int. Cl.
    *G06T 5/50*     (2006.01)
    *G06T 3/40*     (2006.01)

(56) References Cited

U.S. PATENT DOCUMENTS

| | | |
|---|---|---|
| 6,326,967 B1 | 12/2001 | Inoue |
| 2008/0079718 A1 | 4/2008 | Woo |

FOREIGN PATENT DOCUMENTS

| | | |
|---|---|---|
| CN | 1290907 A | 4/2001 |
| CN | 1467987 A | 1/2004 |
| CN | 1894727 A | 1/2007 |
| CN | 1898702 A | 1/2007 |
| CN | 101154294 A | 4/2008 |
| CN | 103049922 A | 4/2013 |
| CN | 103455969 A | 12/2013 |
| TW | 201142754 A | 12/2011 |
| TW | 201243767 A | 11/2012 |

OTHER PUBLICATIONS

International Search Report and Written Opinion dated Sep. 26, 2014 for International Application No. PCT/CN2014/080511, 8 pages.

Office Action dated Oct. 8, 2015 for Chinese Application No. 201310381797.X, 7 pages.

Office Action dated Mar. 1, 2016 for Chinese Application No. 201310381797.X, 19 pages.

Office Action dated Aug. 31, 2016 for Chinese Application No. 201310381797.X, 6 pages.

Office Action dated Jun. 10, 2015 for Taiwanese Application No. 10420762080, 6 pages.

Office Action dated Dec. 31, 2015 for Taiwanese Application No. 10421786930, 5 pages.

\* cited by examiner

METHOD AND APPARATUS FOR PROCESSING IMAGE

PRIORITY STATEMENT

This application is a continuation under 35 U.S.C. § 120 of U.S. application Ser. No. 14/967,924 filed on Dec. 14, 2015, pending, which is a continuation of International Application No. PCT/CN2014/080511, filed on Jun. 23, 2014, which claims priority to Chinese Patent Application No. 201310381797.X, filed on Aug. 28, 2013, all of which are incorporated by reference in their entireties.

FIELD OF THE DISCLOSURE

The present disclosure relates to the field of information technologies, and in particular, to a method and an apparatus for processing an image.

BACKGROUND OF THE DISCLOSURE

With continuous development of information technologies, more and more terminals begin to support image processing. A terminal may often process an image into an image with blur special effects or tailing special effects. How to simply and rapidly process an image at a terminal so as to achieve blur special effects or tailing special effects is a problem to be considered.

Currently, the Gaussian blur algorithm and accumulation buffer are used so as to achieve the blur special effects and the tailing special effects, respectively. By using the Gaussian blur algorithm, weights are distributed to surrounding pixels of a selected pixel according to normal distribution, an average value of the surrounding pixels of the selected pixel is calculated using weighted averaging and a value of the selected pixel is substituted with the average value obtained through calculation, and all pixels are selected sequentially and a value of each selected pixel is substituted with an average value of surrounding pixels of the selected pixel, thereby achieving image processing of blur special effects. By the accumulation buffer, rendered images are sequentially accumulated to the accumulation buffer to achieve image processing of tailing special effects.

However, by using the Gaussian blur algorithm, it is necessary to sequentially select all pixels, distribute weights to surrounding pixels for each selected pixel, and calculate a weighted average value; the calculation process is complicated; and frequent calling of the Gaussian blur algorithm may slow down the image processing speed. The accumulation buffer technologies are not suitable for Android systems and their use range is small.

SUMMARY OF THE DISCLOSURE

The present disclosure provides a method and an apparatus for processing an image. In one aspect, a method for processing an image is provided. The method includes:

acquiring, by one or more processors having memory, a first original image to be processed and creating a preset number copies of the first original image which the preset number copies and the first original image have a same image but different transparencies; offsetting, by one or more processors having memory, content of each copy of the preset number copies of the first original image to obtain the preset number copies of first processed images; and overlaying, by one or more processors having memory, the first original image and the preset number copies of the first processed images, and getting an overlaid first original image as a result of the first original image.

In another aspect, an apparatus for processing an image is provided. The apparatus includes:

an acquiring module having memory and one or more processors that is configured to acquire a first original image to be processed; a creating module having memory and one or more processors that is configured to create a preset number copies of the first original image wherein the preset number copies and the first original image have a same image but different transparencies; a processing module having memory and one or more processors that is configured to offset content of each copy of the preset number copies of the first original image to obtain the preset number copies of first processed images; and an overlaying module having memory and one or more processors that is configured to overlay the first original image and the preset number copies of the first processed images, and get an overlaid first original image as a result of the first original image.

In addition aspect, a product for processing an image, the product includes:

A non-transitory computer readable storage medium with processor executable instructions stored thereon, wherein the instructions when executed by a processor cause the processor to: acquire a first original image to be processed and creating a preset number copies of the first original image wherein the preset number copies and the first original image have a same image but different transparencies; offset content of each copy of the preset number copies of the first original image to obtain the preset number copies of first processed images; and overlay the first original image and the preset number copies of the first processed images, and getting an overlaid first original image as a result of the first original image.

The technical solutions of the examples of the present disclosure provide that:

the calculation process is simplified and the image processing speed is increased by acquiring a first original image to be processed and creating a preset number copies of the first original image wherein the preset number copies and the first original image have a same image but different transparencies; offsetting content of each copy of the preset number copies of the first original image to obtain the preset number copies of first processed images; and overlaying the first original image and the preset number copies of the first processed images, and getting an overlaid first original image as a result of the first original image. Besides, the use range is enlarged since the technical solutions provided by the examples of the present disclosure are also suitable for Android systems.

BRIEF DESCRIPTION OF THE DRAWINGS

To explain the technical solutions of the examples of the present disclosure, accompanying drawings used in the examples are followed. Apparently, the following drawings merely illustrate some examples of the disclosure, but for persons skilled in the art, other drawings can be obtained without creative works according to these drawings.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

To describe the technical solutions in the examples of the present disclosure more clearly, the following briefly introduces the accompanying drawings used for describing the examples of the present disclosure. Obviously, the accompanying drawings in the following description show merely some examples of the present disclosure, and a person of ordinary skill in the art may still derive other drawings from these accompanying drawings without creative efforts.

Figure 1:
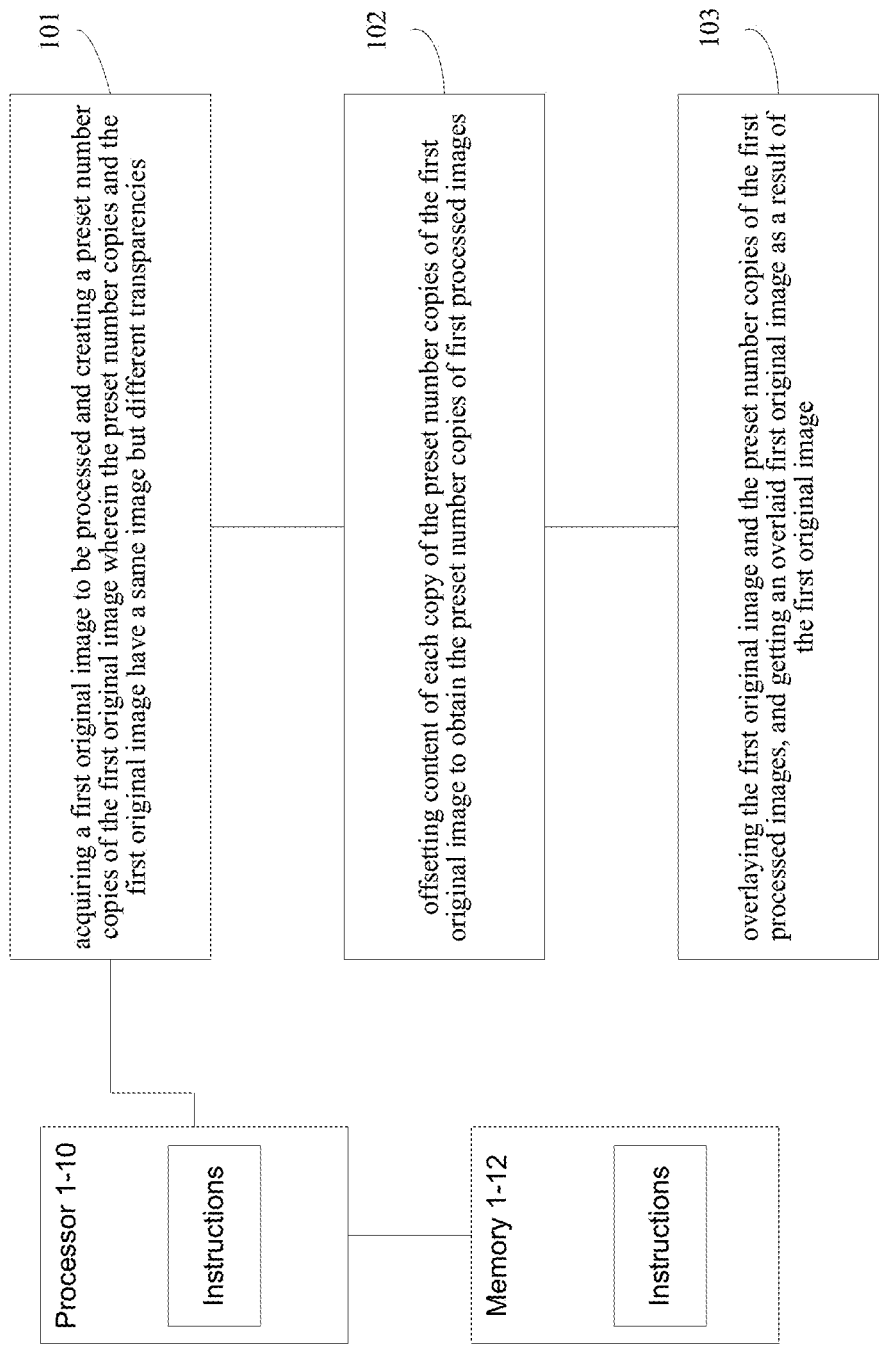
Figure 2:
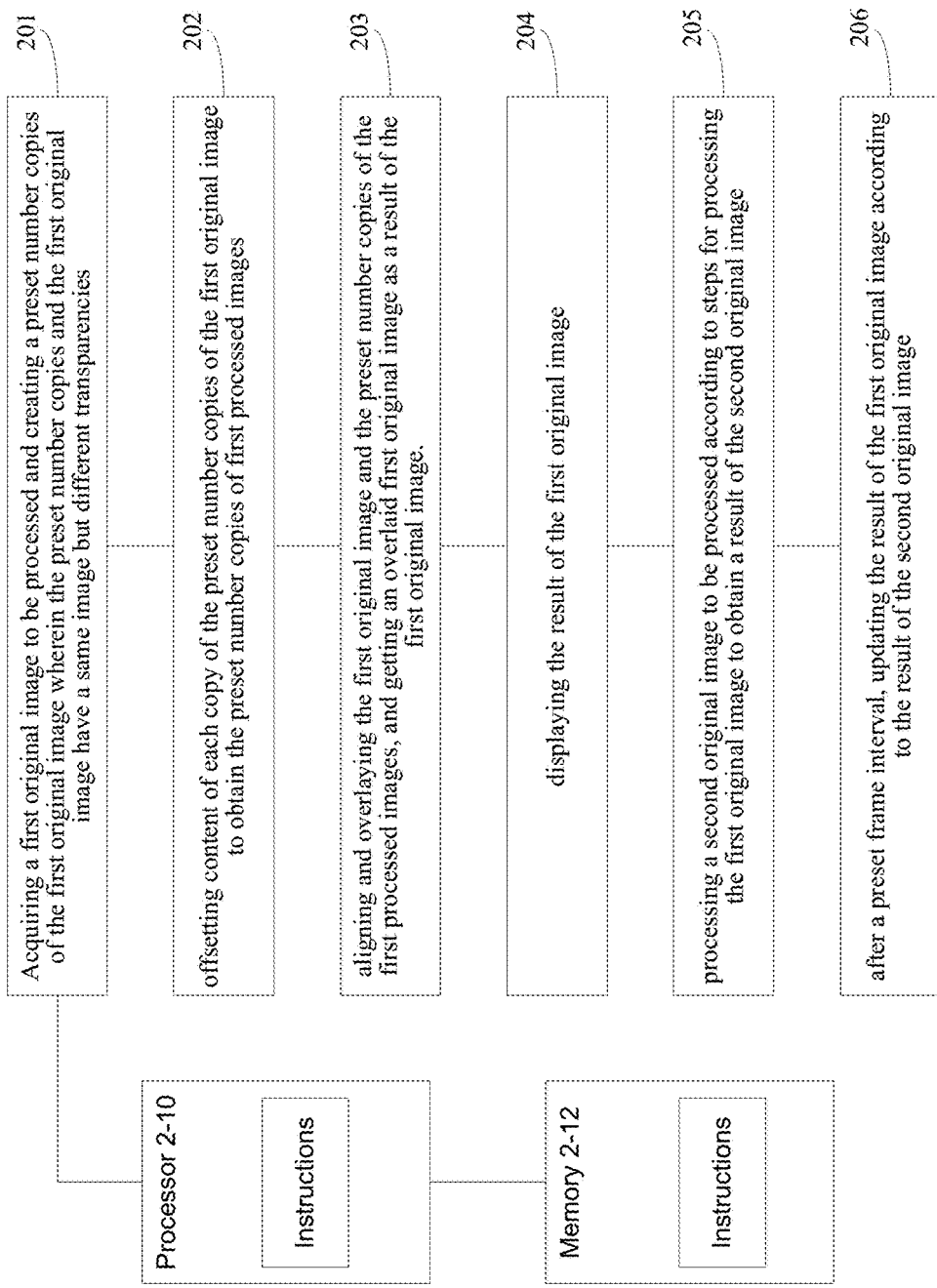
Figure 3:
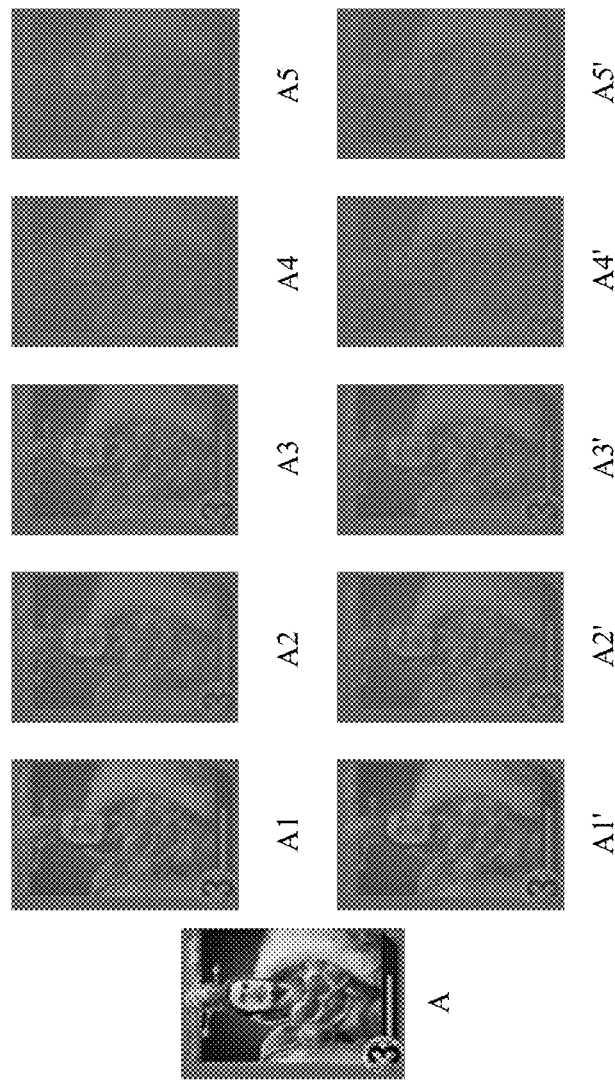
Figure 4:
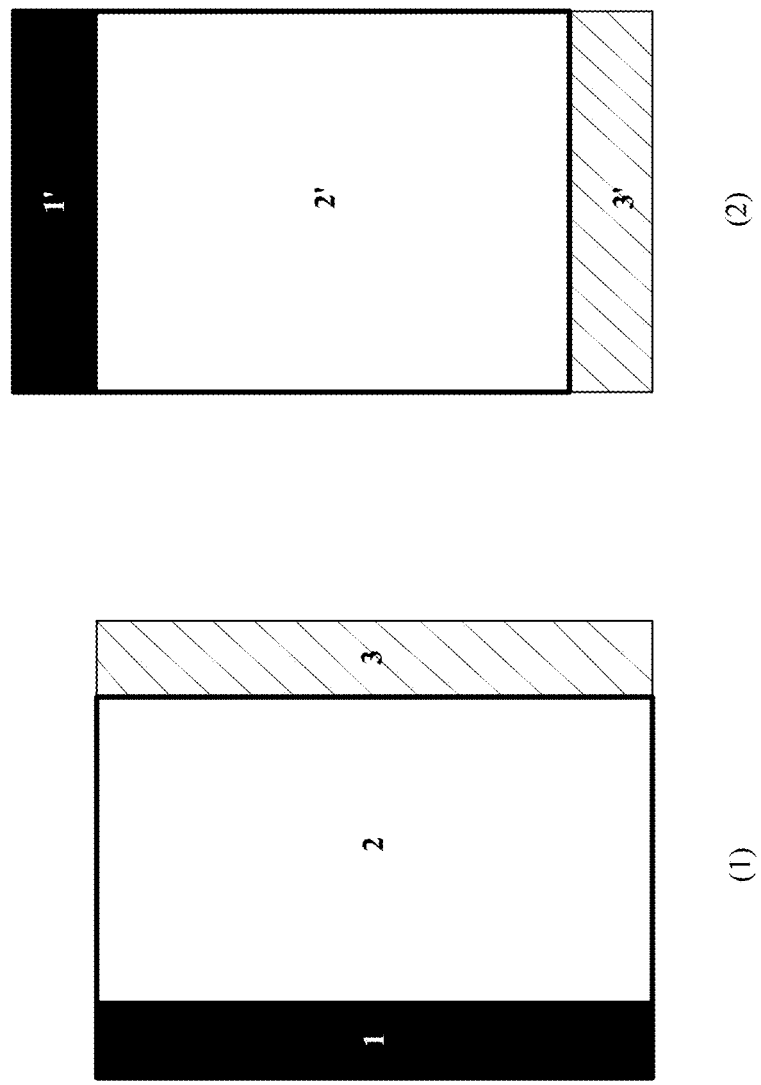
Figure 5:
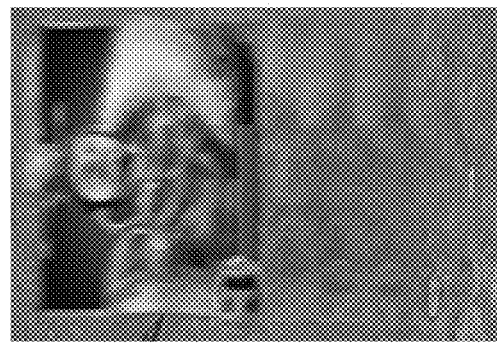
Figure 5:
Figure 6:
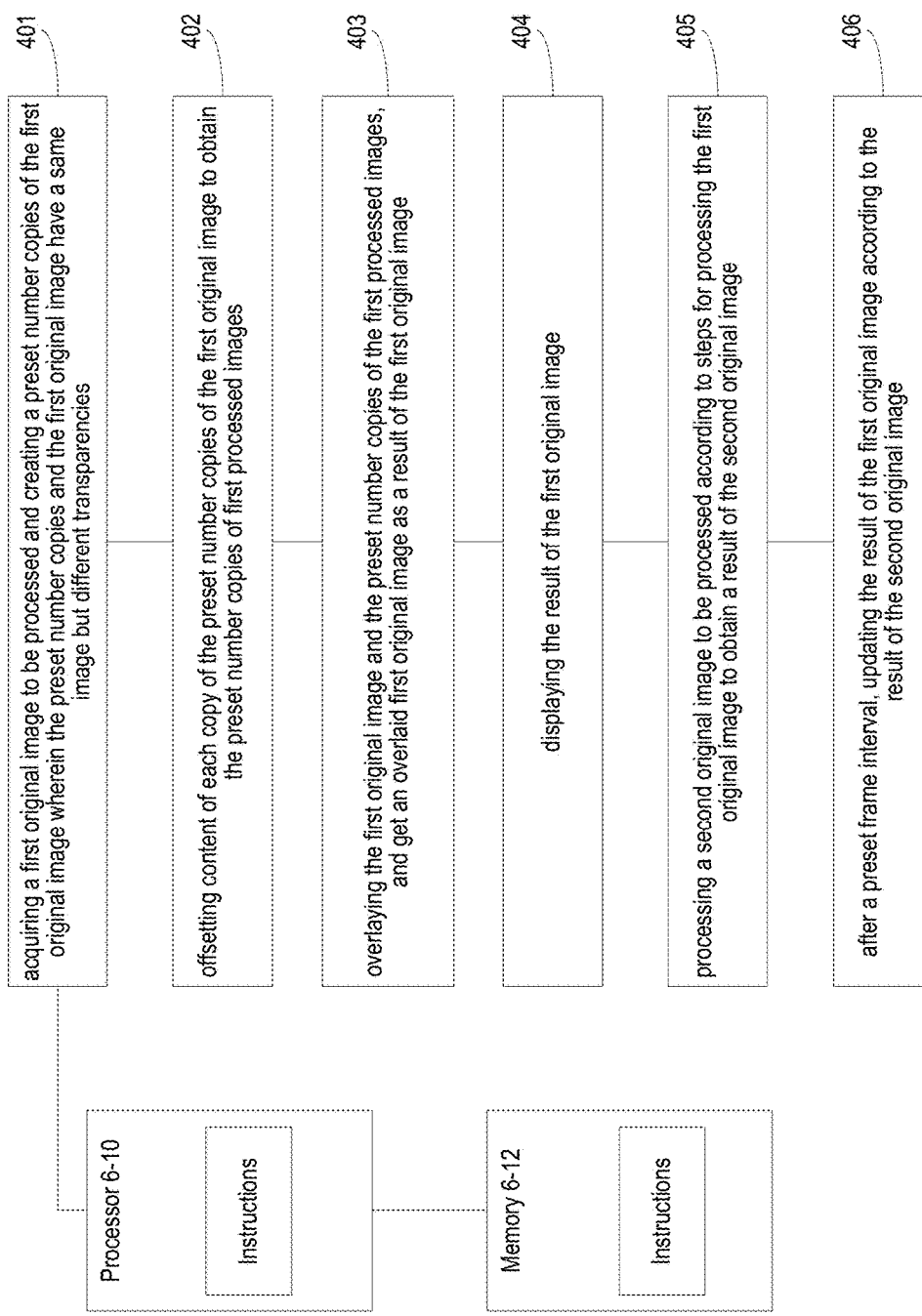
Figure 7:
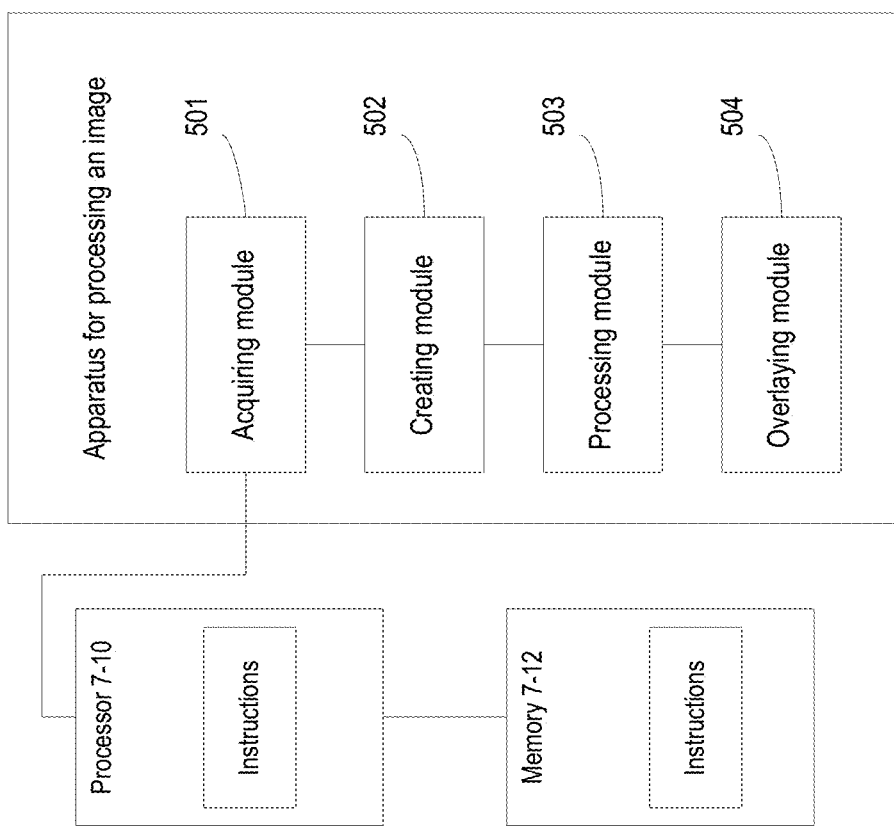
Figure 8:
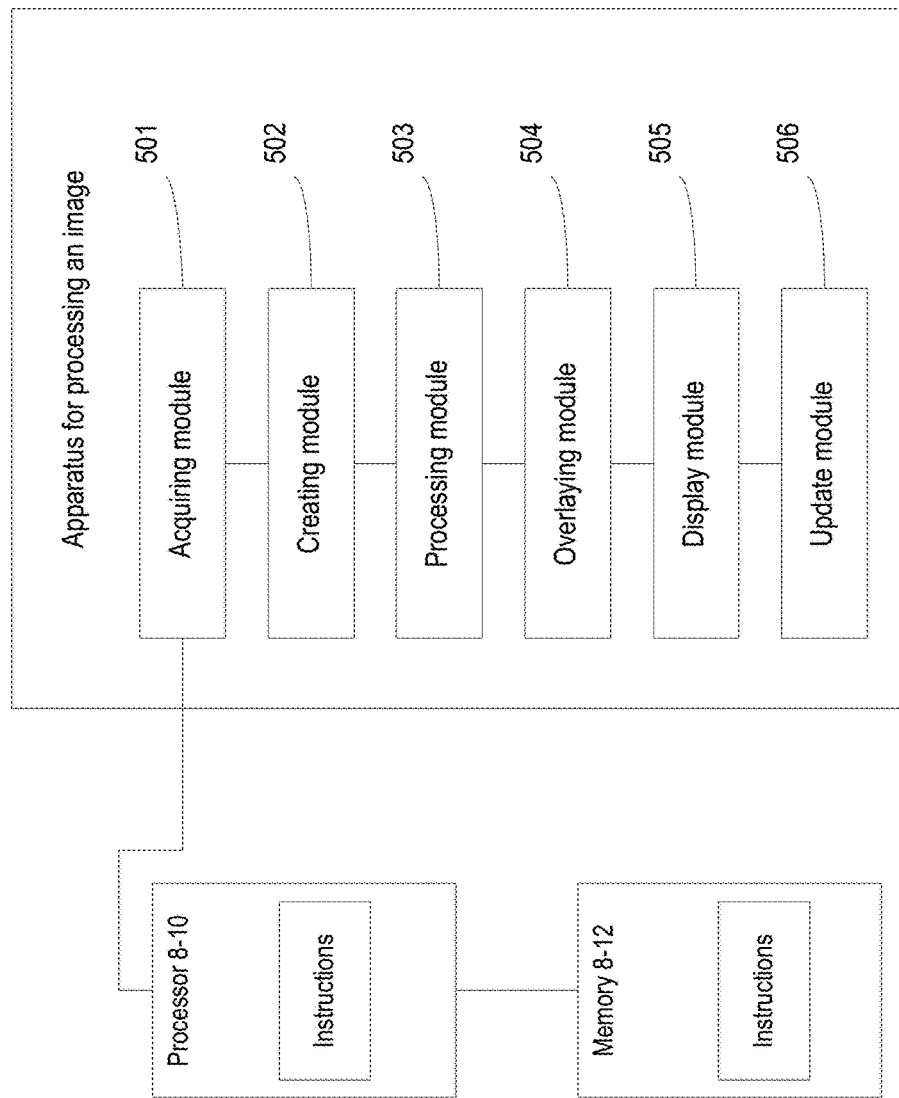
Figure 9:
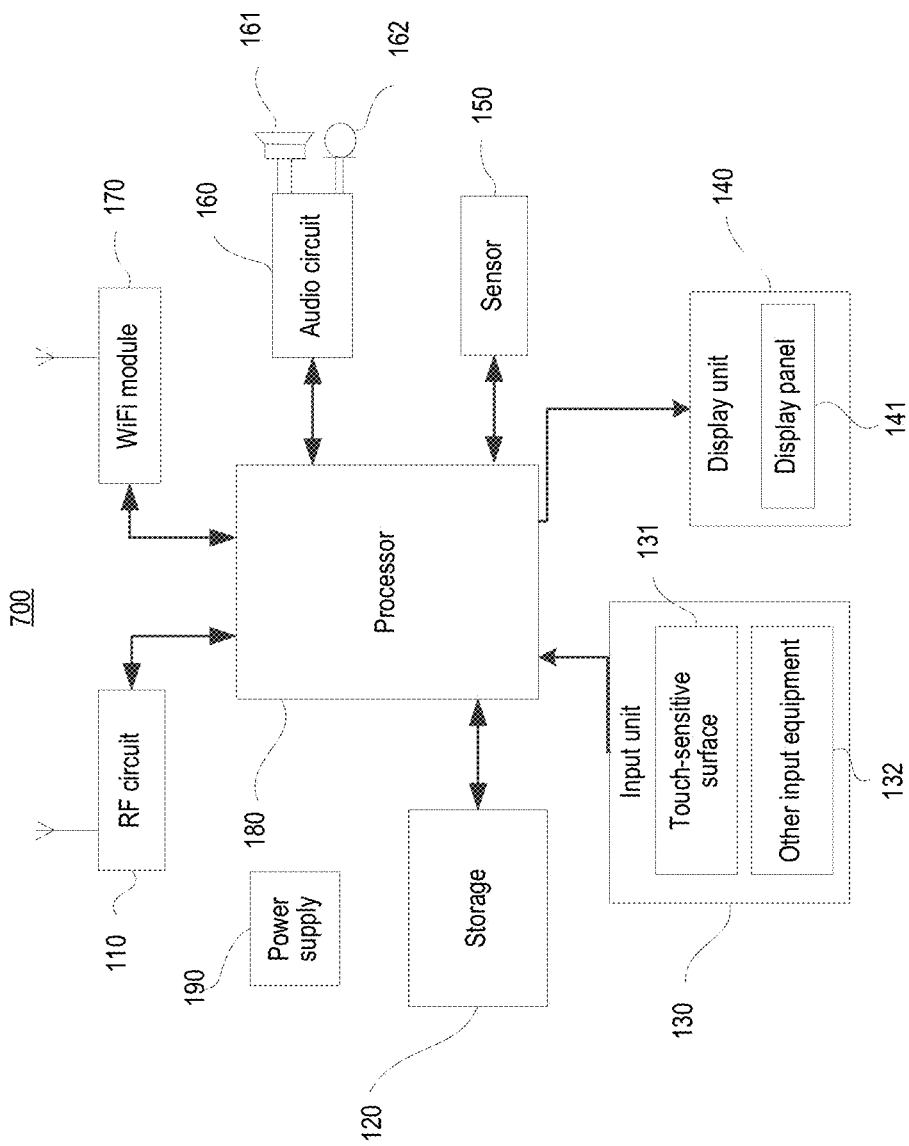

FIG. 1 is a flowchart of a method for processing an image according to an example of the present disclosure;

FIG. 2 is a flowchart of a method for processing an image according to another example of the present disclosure;

FIG. 3 is a schematic diagram of a method for processing an image according to an example of the present disclosure;

FIG. 4 is a schematic diagram of offset processing according to an example of the present disclosure;

FIG. 5 is a schematic diagram of an overlaying effect according to an example of the present disclosure;

FIG. 6 is a flowchart of a method for processing an image according to an example of the present disclosure;

FIG. 7 is a schematic structural diagram of an apparatus for processing an image according to an example of the present disclosure;

FIG. 8 is a schematic structural diagram of an apparatus for processing an image according to an example of the present disclosure; and FIG. 9 is a schematic structural diagram of a terminal according to an example of the present disclosure.

DETAILED DESCRIPTION

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one embodiment," "an embodiment," "example embodiment," "example," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," "in an example," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

It should be noticed that, the embodiments and the features in the embodiments can be combined with each other in a no conflict condition. This invention will become apparent from the following detailed description when taken in conjunction with the accompanying drawings.

It should be noticed that, the steps illustrated in the flowchart of the drawings can be performed in a set of computer device with executable program codes. And the order of the steps can be different from that in the drawings under some status, although a logic order is shown in the flowchart.

In the following description, one or more denotations of actions or operations performed by the computer will be used to show the present invention, unless a special demonstration is pointed out. Concretely, the computer can be a personal computer, a server, or a mobile terminal, etc., and the device with processing chips such as CPU, Single Chip Micyoco, and DSP is also called a computer. It should be understood that, the actions and operations performed by the computer include manipulations to electrical signals for the process unit in the computer. The manipulations convert the data and its position in the storage device of the computer, which is understood by the persons skilled in the art. Data structure of the maintenance data has its physical position in the storage with special attribute. However, there is no limitation in this invention. As understood by persons skilled in the art, the actions and operations described thereinafter can be complemented by hardware.

Turing to the drawings, the same reference numeral indicates the same element, the principle of the invention could be achieved in a suitable computer condition. The following description is based on the embodiments of the present invention, which is not limited to some replacement embodiments failed to be mentioned in the invention however.

Preferably, the present embodiments and examples in the disclosure can provide a machine-readable medium with embodiments stored therein. It should be noticed that, any one suitable medium related to the commands of the invention is within the scope of the invention, such as magnetic media, optical media, or semiconductor media.

To make the objectives, technical solutions, and advantages of the present disclosure more comprehensible, the following further describes implementation manners of the present disclosure in detail with reference to the accompanying drawings.

An example of the present disclosure provides a method for processing an image. Referring to FIG. 1, the procedure of the method includes:

101: Acquiring a first original image to be processed and creating a preset number copies of the first original image wherein the preset number copies and the first original image have a same image but different transparencies.

102: Offsetting content of each copy of the preset number copies of the first original image to obtain the preset number copies of first processed images.

103: Overlaying the first original image and the preset number copies of the first processed images, and getting an overlaid first original image as a result of the first original image.

Each step of the method has memory 1-12 and one or more processors 1-10. Instructions to be executed by the one or more processors 1-10 are stored in the memory 1-12.

Through the method provided by the example of the present disclosure, the calculation process is simplified and the image processing speed is increased by acquiring a first original image to be processed, creating preset number copies of first original image which are the same as the first original image to be processed and have different transparencies, then offsetting content in each first original image copy to obtain preset number copies of first processed images, and subsequently overlaying the first original image to be processed and the preset number copies of the first processed images. In addition, the use range is enlarged since the technical solution provided by the example of the present disclosure is also suitable for Android systems.

To achieve the blur special effects or the tailing special effects, an example of the present disclosure provides a method for processing an image in combination with the content of the above example. To facilitate understanding, this example describes, in details, the method for processing an image provided by this example by using implementation of blur special effects as an example. Referring to FIG. 2, each step of the method has memory 2-12 and one or more processors 1-10. Instructions to be executed by the one or more processors 2-10 are stored in the memory 2-12. The procedure of the method includes:

201: Acquiring a first original image to be processed and creating a preset number copies of the first original image wherein the preset number copies and the first original image have a same image but different transparencies.

With respect to the step, the first original image to be processed may be a random image to be processed. This example does not make specific limit to the first original image to be processed. This example does not make specific limit to the manner for acquiring the first original image to be processed, which includes but not limited to: providing an image processing page, setting an input option in the image processing page, selecting, by a user, an image to be input and processed through the input option, and using the image to be processed that is selected and input by the user as an acquired first original image to be processed.

This example does not limit the number of the preset number copies during creation of preset number copies of first original image to be processed which are the same as the first original image to be processed and have different transparencies.

During specific implementation, the preset number can decide an image processing effect. For example, the blur effects of a processing result from a relatively greater preset number is more obvious than a processing result from a relatively smaller preset number. Therefore, the preset number may be set according to a processing effect.

Regardless of the preset number, the manner for creating copies of first original image to be processed which are the same as the first original image to be processed and have different transparencies includes but not limited to:

First, creating a half of preset number copies of first original image which are the same as the first original image to be processed and setting a corresponding transparency for each first-created first original image copy;

Then creating another half of preset number copies of first original image which are the same as the first original image to be processed and then setting a corresponding transparency for each later-created first original image copy, where the transparency of each later-created first original image copy is the same as the transparency of the first-created first original image copy.

Here, a case where the transparencies are in a value range from 0 to 1, 0 represents completely transparent, 1 represents completely opaque, and the greater numeral represents the more opaque is used as an example. Each of the transparencies of the first-created half of the preset number copies of the first original image is of a specific numeral in the transparency value range; the transparencies of all the first original image may be the same and also may be different, but the transparencies of all copies of the first original image are different from that of the first original image to be processed.

To facilitate understanding, a case where the first original image to be processed is an image A, shown in FIG. 3, and the preset number is 10 is used as an example for description.

Here, the transparency of the image A is 1. As shown in FIG. 3, 5 first original image copies, respectively, an image A1, an image A2, an image A3, an image A4, and an image A5, which are the same as the image A are created first. The transparency of the image A1 is set to be 30% of the transparency of the image A. The transparencies of the image A2 and the image A3 both are set to be 20% of the transparency of the image A. The transparencies of the image A4 and the image A5 both are set to be 10% of the transparency of the image A.

Then, another 5 first original image copies, respectively, an image A1', an image A2', an image A3', an image A4', and an image A5', which are the same as the image A are created later. The transparency of the image A1' is set to be the same as the transparency of the image A1, that is, be 30% of the transparency of the image A. The transparencies of the image A2' and the image A3' are set to be the same as the transparencies of the image A2 and the image A3, that is, be 20% of the transparency of the image A. The transparencies of the image A4' and the image A5' are set to be the same as the transparencies of the image A4 and the image A5, that is, be 10% of the transparency of the image A.

202: Offsetting content of each copy of the preset number copies of the first original image to obtain the preset number copies of first processed images.

Specifically, this example does not make specific limit to the manner for offsetting content in each copy of the first original image, which includes but not limited to:

Creating a rectangular plane coordinate system on the respective copy of first original image by using a center of each first original image copy as an original point, a transverse axis being an x axis and a vertical axis being a y axis, and moving content in each first original image copy for a corresponding offset along the x axis, separately.

The moving direction along the x axis of the first-created half of the preset number copies of the first original image is opposite to that of the later-created half of the preset number copies of the first original image.

For example, if the first-created half of the preset number copies of the first original image is moved along a positive axis of the x axis, the later-created half of the preset number copies of the first original image is moved along a negative axis of the x axis.

Also, for example, if the first-created half of the preset number copies of the first original image is moved along a negative axis of the x axis, the later-created half of the preset number copies of the first original image is moved along a positive axis of the x axis. Besides, after the offset processing is performed on content of all the images according to corresponding offsets, content which is offset from an image display range may no longer be displayed.

At the same time, a corresponding no-content area may also appear in the image display range. To ensure that all the images can maintain original sizes after being moved, colorless filling is performed on the no-content areas in the method provided by this example.

As shown in FIG. 4(1), a case where an image display range is a range as illustrated by a black area 1 plus a blank area 2 is used as an example. Before offsetting content of an image, content of an image is located in an image display range as illustrated by the black area 1 plus the blank area 2.

After offsetting the content of the image, the content of the image is located in a range as illustrated by the blank area 2 plus a shadow area 3. Because the blank area 2 is within the image display range and the shadow area 3 is not within the image display range, as can be known from FIG. 4(1), the content in the blank area 2 may still be displayed, but the content in the shadow area 3 is not displayed.

Moreover, because the offset processing is performed on the content of the image, the black area 1 is a no-content area. Colorless filling may be performed on the black area 1 so as to maintain an original size of the image.

Furthermore, this example does not make limit to a size of a moved offset of content for each first original image copy. To achieve blur effects, the moved offset for the content of each created first original image copy may increase successively in a sequence. This example does not make specific limit to a size of an offset increased, and the offsets increased may be the same and also may be different for each time.

To facilitate understanding, the image, shown in FIG. 3, is also used as an example, and rectangular plane coordinate systems are created on the respective images by using the centers of the image A1 to the image A5 and the image A1' to the image A5' as original points.

A transverse axis is an x axis; a vertical axis is a y axis. An increased offset being 2 pixels during offset processing on the ten images is used as an example for description.

For the first-created images, the content in the image A1 is moved for 2 pixels along the positive axis of the x axis; the content in the image A2 is moved for 4 pixels along the positive axis of the x axis; the content in the image A3 is moved for 6 pixels along the positive axis of the x axis; the content in the image A4 is moved for 8 pixels along the positive axis of the x axis; and the content in the image A5 is moved for 10 pixels along the positive axis of the x axis.

For the later-created images, the content in the image A1' is moved for 2 pixels along the negative axis of the x axis; the content in the image A2' is moved for 4 pixels along the negative axis of the x axis; the content in the image A3' is moved for 6 pixels along the negative axis of the x axis; the content in the image A4' is moved for 8 pixels along the negative axis of the x axis; and the content in the image A5' is moved for 10 pixels along the negative axis of the x axis.

203: Aligning and overlaying the first original image and the preset number copies of the first processed images, and getting an overlaid first original image as a result of the first original image.

With respect to the step, since offset processing is performed on the content of each copy of the first original image and each copy of the first original image has a different transparency, an image having blur special effects can be obtained after aligning and overlaying the first original image to be processed and the preset number copies of the first processed images.

Also, the first original image to be processed and the created preset number copies of the first processed images, shown in FIG. 3, are used as an example. An effect after aligning and overlaying the first original image to be processed and the preset number copies of the first processed images may be illustrated by an image R1 in FIG. 5.

Here, only overlaying processing is performed in the process of aligning and overlaying the first original image to be processed and the preset number copies of the first processed images; the process is relatively simple; therefore, it may be frequently called without slowing down the image processing speed. Moreover, the method is also suitable for Android systems.

Specifically, the process of aligning and overlaying the first original image to be processed and the preset number copies of the first processed images includes but not limited to:

rendering the first original image to be processed into a back buffer;

multiplying content in the back buffer by a preset scale factor and storing the product in an accumulation buffer; and performing a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently storing image and original content in the accumulation buffer, after than, substituting the original content in the accumulation buffer with the overlaid content each time after an image is stored in the accumulation buffer until all the preset number copies of the first processed images are overlaid in the accumulation buffer to obtain an overlaid image.

In specific implementation, the overlaying process can be achieved by calling a corresponding function.

For example: prior to rendering, a glRrawBuffer(GL_BACK) function is called to render a first image to be processed into the back buffer, and then a glReadBuffer (GL_BACK) is called to set that the accumulation buffer reads from the back buffer.

The setting process is default in a visualized system and does not need to be configured. However, the buffers need to be reset when the rendered and read buffers need to be changed.

Prior to rendering, a glClear(bitfield) function also needs to be called to clear the back buffer for use in rendering the first original image to be processed. After clearing the back buffer, the first original image to be processed is rendered into the back buffer.

Then, a glAccum(GL_LOAD,1.f/n) function is called to multiply content in the back buffer by the preset scale factor and store the product to the accumulation buffer. The content in the back buffer includes three color components, namely, red R, green G, and blue B, of a color of the image after the first original image to be processed is rendered, and a transparency A of the image.

Generally, the RGB each have 256 levels of luminance, as indicated in numerals, from 0 to 255. The preset scale factor is in a value range from 0 to 1. The process of multiplying the content in the back buffer by the preset scale factor and storing the product to the accumulation buffer is a process of multiplying the RGB color components and the transparency A by the preset scale factor and storing the product to the accumulation buffer.

Subsequently, a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently stored image and original content in the accumulation buffer, and then, substituting the original content in the accumulation buffer with overlaid content each time after an image is stored in the accumulation buffer is performed until all the preset number copies of the first processed images are overlaid in the accumulation buffer to obtain an overlaid image. Here, the function called in the overlaying process is glAccum(GL_ACCUM,1.f/n).

To facilitate understanding, a process in which a first original image to be processed is an image P, a first copy of the processed first original image copy is an image P1, a second copy of the processed first original image copy is an image P2, and the image P, the image P1, and the image P2 are overlaid is used as an example.

First, the back buffer is cleared. Subsequently, the image P is rendered into the back buffer. Then, the content rendered from the image P into the back buffer is multiplied by the preset scale factor and stored to the accumulation buffer.

Later, the image P1 is rendered into the back buffer. Then, the content rendered from the image P1 into the back buffer is multiplied by the preset scale factor, overlaid with original content in the accumulation buffer, and stored to the accumulation buffer. Later, the image P2 is rendered into the back buffer. Then, the content rendered from the image P2 into the back buffer is multiplied by the preset scale factor, overlaid with original content in the accumulation buffer, and stored to the accumulation buffer. Up to now, the processed images P, P1, and P2 are all accumulated to the accumulation buffer, to obtain an overlaid image.

Furthermore, if the processing of the first original image to be processed is finished through step 201 to step 203, so that a result after the processing presents blur special effects. The method also includes a subsequent display step.

204: Displaying the result of the first original image.

With respect to the step, the manner for displaying the result of processing the first original image to be processed includes but not limited to: using a display screen of a terminal for display. Apart from the display manners, other manners may also be used for display, which is not specifically defined in this example.

Furthermore, for a case where a plurality of images needs to be processed, the method provided by this example also includes subsequent steps.

205: processing a second original image to be processed according to steps for processing the first original image to obtain a result of the second original image.

With respect to the step, content of the second original image to be processed may be the same as or different from the content of the first original image to be processed. This example does not make specific limit to the second original image to be processed.

Here, only a case where the first original image to be processed is used as an initially processed image and a non-initially processed image is the second original image to be processed is used as an example.

That is to say, other images all can be processed according to the manner for processing an initially processed image after the image is initially processed according to the processing process of step 201 to step 203.

This example does not define copies of images which are processed. When the second original image to be processed is processed according to the manner and steps for processing the first original image to be processed, the content in step 201 to step 203 may be referred to, which is not described in details again herein.

Furthermore, with respect to a plurality of images which is processed: if the plurality of images is connected to construct an animation, the plurality of processed images may be successively displayed in an order, so that the animation presents blur special effects. The specific process is detailed in subsequent step 206.

206: After a preset frame interval, updating the result of the first original image according to the result of the second original image.

Specifically, the preset time interval is an interval for displaying each processed image. This example does not define the manner for determining the preset frame interval. In implementation, a value obtained by dividing 1 s by the number of all copies of processed images to be displayed is determined to be the preset frame interval. For example, 5 original images to be processed are processed according to the manner. During display of the 5 processed images, the preset time interval=⅕=0.2 s. That is to say, a next processed image is displayed for every other 0.2 s.

This example does not make specific limit to the manner for displaying different processed images. Here, only a case where a result of processing a second original image to be processed is displayed by updating a result of processing a first original image to be processed according to a result of processing the second original image to be processed is used as an example.

The specific update process includes but not limited to: first, determining a preset time interval by calling a ufoRender function in a cross-platform framework, then calling hierarchies to enter a SystemManager (system manager) and execute handle (o_float dt), subsequently entering a CCScheduler (scheduling progress) procedure to execute update(float dt), and later entering a CCActionManager (action manager) to add an action into an action queue through update (float dt) and finally execute update (float dt) of the CCAction (action), thereby updating the result of processing the first original image to be processed according to the result of processing the second original image to be processed.

The first original image to be processed and the second original image to be processed both have blur special effects, so the result of processing the second original image to be processed may be displayed after updating the result of processing the first original image to be processed according to the result of processing the second original image to be processed; therefore, switch display of two images is achieved.

Later, the result of processing the second original image to be processed may also be updated by a result of processing a next image according to the manner; therefore, the plurality of processed images is successively displayed in an order and presents animation effects of blur special effects.

Through the method provided by the example of the present disclosure, the calculation process is simplified and the image processing speed is increased by acquiring a first original image to be processed, creating preset number copies of first original image which are the same as the first original image to be processed and have different transparencies, then offsetting content in each copy of the first original image to obtain preset number copies of first processed images, and subsequently aligning and overlaying the first original image to be processed and the preset number copies of the first processed images. Besides, the use range is enlarged since the technical solution provided by the example of the present disclosure is also suitable for Android systems.

Fluent visual effects are achieved by displaying the result of processing the first original image to be processed, processing the second original image to be processed according to the manner and steps for processing the first original image to be processed to obtain a result of processing the second original image to be processed, and in a preset frame interval time, updating the result of processing the first original image to be processed according to the result of processing the second original image to be processed.

An example of the present disclosure provides a method for processing an image. Referring to FIG. 6, each step of the method has memory 6-12 and one or more processors 6-10. Instructions to be executed by the one or more processors 6-10 are stored in the memory 6-12. The procedure of the method includes:

401: Acquiring a first original image to be processed and creating preset number copies of first original image which are the same as the first original image to be processed and have different transparencies.

With respect to the step, the first original image to be processed can be a random image to be processed. This example does not make specific limit to the first original image to be processed. This example does not make specific limit to the manner for acquiring the first original image to be processed, which includes but not limited to: providing an image processing page, setting an input option in the image processing page, selecting, by a user, an image to be input and processed through the input option, and using the image to be processed that is selected and input by the user as an acquired first original image to be processed.

This example does not make limit to the number of the preset number copies during creation of preset number copies of first original image to be processed copies which are the same as the first original image to be processed and have different transparencies.

During specific implementation, the preset number can decide an image processing effect. For example, the blur effects of a processing result from a relatively greater preset number is more obvious than a processing result from a relatively smaller preset number. Therefore, the preset number may be set according to a processing effect.

Regardless of the preset number, the manner for creating first original image to be processed copies which are the same as the first original image to be processed and have different transparencies includes but not limited to:

First, creating a half of preset number copies of first original image which are the same as the first original image to be processed and setting a corresponding transparency for each first-created first original image copy;

Then creating another half of preset number copies of first original image which are the same as the first original image to be processed and then setting a corresponding transparency for each later-created first original image copy, where the transparency of each later-created first original image copy is the same as the transparency of the first-created first original image copy.

Here, a case where the transparencies are in a value range from 0 to 1, 0 represents completely transparent, 1 represents completely opaque, and the greater numeral represents the more opaque is used as an example. Each of the transparencies of the first-created half of the preset number copies of the first original image is of a specific numeral in the transparency value range; the transparencies of all the first original image may be the same and also may be different, but the transparencies of all copies of the first original image are different from that of the first original image to be processed.

To facilitate understanding, a case where the first original image to be processed is an image A, shown in FIG. 3, and the preset number is 10 is used as an example for description.

Here, the transparency of the image A is 1. As shown in FIG. 3, 5 first original image copies, respectively, an image A1, an image A2, an image A3, an image A4, and an image A5, which are the same as the image A are created first. The transparency of the image A1 is set to be 30% of the transparency of the image A. The transparencies of the image A2 and the image A3 both are set to be 20% of the transparency of the image A. The transparencies of the image A4 and the image A5 both are set to be 10% of the transparency of the image A.

Then, another 5 first original image copies, respectively, an image A1', and image A2', an image A3', an image A4', and an image A5', which are the same as the image A are created later. The transparency of the image A1' is set to be the same as the transparency of the image A1, that is, be 30% of the transparency of the image A. The transparencies of the image A2' and the image A3' are set to be the same as the transparencies of the image A2 and the image A3, that is, be 20% of the transparency of the image A. The transparencies of the image A4' and the image A5' are set to be the same as the transparencies of the image A4 and the image A5, that is, be 10% of the transparency of the image A.

402: Offsetting content in each first original image copy to obtain preset number copies of first processed images.

Specifically, this example does not make specific limit to the manner for offsetting content in each copy of the first original image, which includes but not limited to: creating a rectangular plane coordinate system on the respective first original image copy by using a center of each first original image copy as an original point, a transverse axis being an x axis and a vertical axis being a y axis, and moving content in each first original image copy for a corresponding offset along the y axis, separately.

The moving direction along the y axis of the first-created half of the preset number copies of the first original image is opposite to that of the later-created half of the preset number copies of the first original image copies. For example, if the first-created half of the preset number copies of the first original image is moved along a positive axis of the y axis, the later-created half of the preset number copies of the first original image is moved along a negative axis of the y axis.

Also, for example, if the first-created half of the preset number copies of the first original image is moved along a negative axis of the y axis, the later-created half of the preset number copies of the first original image is moved along a positive axis of the y axis.

Besides, after the offsetting is performed on content of all the images according to corresponding offsets, content which is offset from an image display range may no longer be displayed. At the same time, a corresponding no-content area may also appear in the image display range.

To ensure that all the images can maintain original sizes after being moved, colorless filling is performed on the no-content areas in the method provided by this example.

As shown in FIG. 4(2), a case where an image display range is a range as illustrated by a black area 1' plus a blank area 2' is used as an example. Before offsetting content of an image, content of an image is located in an image display range as illustrated by the black area 1' plus the blank area 2'. After offsetting the content of the image, the content of the image is located in a range as illustrated by the blank area 2' plus a shadow area 3'. Because the blank area 2' is within the image display range and the shadow area 3' is not within the image display range, as can be known from FIG. 4(2), the content in the blank area 2' may still be displayed, but the content in the shadow area 3' is not displayed.

Moreover, because the offset processing is performed on the content of the image, the black area 1' is a no-content area. Colorless filling may be performed on the black area 1' so as to maintain an original size of the image.

Furthermore, this example does not make limit to a size of a moved offset of content for each copy of the first original image. To achieve blur effects, the moved offset for the content of each created first original image copy may increase successively in a sequence. This example does not make specific limit to a size of an offset increased, and the offsets increased may be the same and also may be different for each time.

To facilitate understanding, the image, shown in FIG. 3, is also used as an example, and rectangular plane coordinate systems are created on the respective images by using the centers of the image A1 to the image A5 and the image A1' to the image A5' as original points. A transverse axis is an x axis; a vertical axis is a y axis. An increased offset being 2 pixels during offset processing on the ten images is used as an example for description.

For the first-created images, the content in the image A1 is moved for 2 pixels along the positive axis of the y axis; the content in the image A2 is moved for 4 pixels along the positive axis of the y axis; the content in the image A3 is moved for 6 pixels along the positive axis of the y axis; the content in the image A4 is moved for 8 pixels along the positive axis of the y axis; and the content in the image A5 is moved for 10 pixels along the positive axis of the y axis.

For the later-created images, the content in the image A1' is moved for 2 pixels along the negative axis of the y axis; the content in the image A2' is moved for 4 pixels along the negative axis of the y axis; the content in the image A3' is moved for 6 pixels along the negative axis of the y axis; the content in the image A4' is moved for 8 pixels along the negative axis of the y axis; and the content in the image A5' is moved for 10 pixels along the negative axis of the y axis.

403: Overlaying the first original image to be processed and the preset number copies of the first processed images according to a preset offset distance and use an overlaid image as a result of processing the first original image to be processed.

With respect to the step, since the offsetting is performed on the content of each copy of the first original image and each first original image copy has a different transparency, an image having tailing special effects can be obtained after overlaying the first original image to be processed and the preset number copies of the first processed images according to a preset offset distance.

Also, the first original image to be processed and the created preset number copies of the first processed images, shown in FIG. 3, are used as an example. An effect after aligning and overlaying the first original image to be processed and the preset number copies of the first processed images may be illustrated by an image R2 in FIG. 5.

Here, only overlaying processing is performed in the process of overlaying the first original image to be processed and the preset number copies of the first processed images according to the preset offset distance; the process is relatively simple; therefore, it may be frequently called without slowing down the image processing speed. Moreover, the method is also suitable for Android systems.

Specifically, the process of overlaying the first original image to be processed and the preset number copies of the first processed images according to the preset offset distance includes but not limited to:

rendering the first original image to be processed into a back buffer;

multiplying content in the back buffer by a preset scale factor and storing the product to an accumulation buffer; and performing a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently storing image and original content in the accumulation buffer and then, substituting the original content in the accumulation buffer with overlaid content each time after an image is stored in the accumulation buffer until all the preset number copies of the first processed images are overlaid in the accumulation buffer to obtain an overlaid image.

In specific implementation, the overlaying process can be achieved by calling a corresponding function. For example: prior to rendering, a glRrawBuffer(GL_BACK) function is called to render a first image to be processed into the back buffer, and then a glReadBuffer(GL_BACK) is called to set that the accumulation buffer reads from the back buffer. The setting process is default in a visualized system and does not need to be configured. However, the buffers need to be reset when the rendered and read buffers need to be changed.

Prior to rendering, a glClear(bitfield) function also needs to be called to clear the back buffer for use in rendering the first original image to be processed. After clearing the back buffer, the first original image to be processed is rendered into the back buffer. Then, a glAccum(GL_LOAD,1.f/n) function is called to multiply content in the back buffer by the preset scale factor and store the product to the accumulation buffer.

The content in the back buffer includes three color components, namely, red R, green G, and blue B, of a color of the image after the first original image to be processed is rendered, and a transparency A of the image.

Generally, the RGB each have 256 levels of luminance, as indicated in numerals, from 0 to 255. The preset scale factor is in a value range from 0 to 1. The process of multiplying the content in the back buffer by the preset scale factor and storing the product to the accumulation buffer is a process of multiplying the RGB color components and the transparency A by the preset scale factor and storing the product to the accumulation buffer.

Subsequently, a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently stored image and original content in the accumulation buffer, and then substituting the original content in the accumulation buffer with overlaid content each time after an image is stored in the accumulation buffer is performed until all the preset number copies of the first processed images are overlaid in the accumulation buffer to obtain an overlaid image. Here, the function called in the overlaying process is glAccum(GL_ACCUM,1.f/n).

To facilitate understanding, a process in which a first original image to be processed is an image P', a first copy of the processed first original image copy is an image P1', a second copy of the processed first original image copy is an image P2', and the image P', the image P1', and the image P2' are overlaid is used as an example.

First, the back buffer is cleared. Subsequently, the image P' is rendered into the back buffer. Then, the content rendered from the image P' into the back buffer is multiplied by the preset scale factor and stored to the accumulation buffer. Later, the image P1' is rendered into the back buffer. Then, the content rendered from the image P1' into the back buffer is multiplied by the preset scale factor, overlaid with original content in the accumulation buffer, and stored to the accumulation buffer.

Later, the image P2' is rendered into the back buffer. Then, the content rendered from the image P2' into the back buffer is multiplied by the preset scale factor, overlaid with original content in the accumulation buffer, and stored to the accumulation buffer. Up to now, the processed images P', P1', and P2' are all accumulated to the accumulation buffer, to obtain an overlaid image.

Further, if the processing of the first original image to be processed is finished through step 401 to step 403, so that a result after the processing presents tailing special effects. The method also includes a subsequent display step.

404: Displaying the result of the first original image.

With respect to the step, the manner for displaying the result of the first original image to be processed includes but not limited to: using a display screen of a terminal for display. Apart from the display manners, other manners may also be used for display, which is not specifically defined in this example.

Furthermore, for a case where a plurality of images needs to be processed, the method provided by this example also includes subsequent steps.

405: Processing a second original image to be processed according to the manner and steps for processing the first original image to be processed, to obtain a result of the second original image to be processed.

With respect to the step, content of the second original image to be processed may be the same as or different from the content of the first original image to be processed. This example does not make specific limit to the second original image to be processed.

Here, only a case where the first original image to be processed is used as an initially processed image and a non-initially processed image is the second original image to be processed is used as an example.

That is to say, other images can be processed according to the manner and steps for processing an initially processed image after the image is initially processed according to the processing process of step 401 to step 403. This example does not define copies of images which are processed. When the second original image to be processed is processed according to the manner and steps for processing the first original image to be processed, the content in step 401 to step 403 may be referred to, which is not described in details again herein.

Furthermore, with respect to a plurality of images which is processed: if the plurality of images is connected to construct an animation, the plurality of processed images may be successively displayed in an order, so that the animation presents tailing special effects. The specific process is detailed in subsequent step 406.

406: After a preset frame interval, updating the result of the first original image according to the result of the second original image Specifically, the preset frame interval is an interval for displaying each processed image. This example does not define the manner for determining the preset frame interval time. In implementation, a value obtained by dividing 1 s by the number of all copies of processed images to be displayed is determined to be the preset frame interval time. For example, 5 original images to be processed are processed according to the manner. During display of the 5 processed images, the frame interval time=⅕=0.2 s. That is to say, a next processed image is displayed for every other 0.2 s.

This example does not make specific limit to the manner for displaying different processed images. Here, only a case where a result of a second original image to be processed is displayed by updating a result of a first original image to be processed according to a result of the second original image to be processed is used as an example.

The specific update process includes but not limited to: first, determining a preset time interval by calling a ufoRender function in a cross-platform framework, then calling hierarchies to enter a SystemManager (system manager) and execute handle (o_float dt), subsequently entering a CCScheduler (scheduling progress) procedure to execute update(float dt), and later entering a CCActionManager (action manager) to add an action into an action queue through update(float dt) and finally execute update(float dt) of the CCAction (action), thereby updating the result of the first original image to be processed according to the result of the second original image to be processed.

The first original image to be processed and the second original image to be processed both have tailing special effects, so the result of the second original image to be processed may be displayed after updating the result of the first original image to be processed according to the result of the second original image to be processed; therefore, switch display of two images is achieved. Later, the result of the second original image to be processed may also be updated by a result of a next image according to the manner; therefore, the plurality of processed images is successively displayed in an order and presents animation effects of tailing special effects.

To sum up, through the method provided by the example of the present disclosure, the calculation process is simplified and the image processing speed is increased by acquiring a first original image to be processed, creating preset number copies of first original image which are the same as the first original image to be processed and have different transparencies, then offsetting content in each first original image copy to obtain preset number copies of first processed images, and subsequently overlaying the first original image to be processed and the preset number copies of the first processed images according to a preset offset distance. Besides, the use range is enlarged since the technical solution provided by the example of the present disclosure is also suitable for Android systems.

Fluent visual effects are achieved by displaying the result of the first original image to be processed, the result of the second original image to be processed according to the manner and steps for processing the first original image to be processed to obtain a result of the second original image to be processed, and after a preset frame interval, updating the result of the first original image according to the result of the second original image.

An example of the present disclosure provides an apparatus for processing an image. Referring to FIG. 7, the apparatus includes:

an acquiring module 501, configured to acquire a first original image to be processed;

a creating module 502, configured to create preset number copies of first original image which are the same as the first original image to be processed and have different transparencies;

a processing module 503, configured to offset content in each copy of first original image to obtain preset number copies of first processed images; and an overlaying module 504, configured to overlay the first original image to be processed and the preset number copies of the first processed images and use an overlaid image as a result of processing the first original image to be processed.

The apparatus has memory 7-12 and one or more processors 7-10. Instructions to be executed by the one or more processors 7-10 are for performing functions of modules are stored in the memory 7-12.

As a preferred example, the overlaying module 504 is configured to align and overlay the first original image to be processed and the preset number copies of the first processed images.

As a preferred example, the overlaying module 504 is configured to overlay the first original image to be processed and the preset number copies of the first processed images according to a preset offset distance.

As a preferred example, referring to FIG. 8, the apparatus has memory 8-12 and one or more processors 8-10. Instructions to be executed by the one or more processors 8-10 are for performing functions of modules are stored in the memory 8-12.

The apparatus in FIG. 8 also includes:

a display module 505, configured to display the result of processing the first original image to be processed.

As a preferred example, the overlaying module 504 is configured to render the first original image to be processed into a back buffer; multiply content in the back buffer by a preset scale factor and store the product to an accumulation buffer; and perform a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently storing image and original content in the accumulation buffer, and then substituting the original content in the accumulation buffer with overlaid content each time after an image is stored in the accumulation buffer until all the preset number copies of the first processed images are overlaid in the accumulation buffer to obtain the overlaid image.

As a preferred example, the display module 505 is configured to copy content in the accumulation buffer to the back buffer, multiply content in the back buffer by a preset coefficient, exchange the product to a front buffer, and display content in the front buffer.

As a preferred example, referring to FIG. 8, the apparatus also includes:

an update module 506, configured to process a second original image to be processed according to the manner and steps for processing the first original image to be processed, to obtain a result of the second original image to be processed; and after a preset frame interval, update the result of the first original image according to the result of the second original image Through the apparatus provided by the example of the present disclosure, the calculation process is simplified and the image processing speed is increased by acquiring a first original image to be processed, creating preset number copies of first original image which are the same as the first original image to be processed and have different transparencies, then offsetting content in each copy of the first original image to obtain preset number copies of first processed images, and subsequently overlaying the first original image to be processed and the preset number copies of the first processed images. Besides, the use range is enlarged since the technical solution provided by the example of the present disclosure is also suitable for Android systems.

In addition, fluent visual effects are achieved by displaying the result of processed the first original image to be processed, processed the second original image to be processed according to the manner and steps for processing the first original image to be processed to obtain a result of processed the second original image to be processed, and after a preset frame interval, updating the result of the first original image according to the result of the second original image.

An example of the present disclosure provides a terminal. Referring to FIG. 9, FIG. 9 is a schematic structural diagram of a terminal related in the example of the present disclosure. The terminal may be used in the methods for processing an images provided in the foregoing examples. To describe specifically:

A terminal 700 may include components such as an RF (Radio Frequency, radio frequency) circuit 110, a storage 120 including one or more computer readable storage medium, an input unit 130, a display unit 140, a sensor 150, an audio circuit 160, a WiFi (Wireless Fidelity, wireless fidelity) module 170, a processor 180 including one or more processing cores, and a power supply 190. A person skilled in the art may understand that the terminal structure shown in FIG. 9 does not constitute limit to the terminal, and more or less components than those shown in FIG. 9 may be included, or some of the components are combined, or the components are distributed in different manner. Here:

The RF circuit 110 may be used in a process of receiving and sending information or a call for receiving and sending a signal, and in particular, receiving downlink information of a base station and handing it over to one or more processors 180 for processing and additionally sending data related to an uplink to the base station.

Generally, the RF circuit 110 includes but not limited to an antenna, at least one amplifier, a tuner, one or more oscillators, a subscriber identity module (SIM) card, a transceiver, a coupler, an LNA (Low Noise Amplifier, low noise amplifier), and a duplexer.

Besides, the RF circuit 110 may also communicate with other equipment through wireless communication and a network. The wireless communication may use any communication standard or protocol and include but not limited to GSM (Global System of Mobile communication, Global System of Mobile communication), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), e-mail, and SMS (Short Messaging Service, Short Messaging Service).

The storage 120 may be configured to store a software program and a module. The processor 180 executes various functional application and data processing by executing a software program and a module stored in the storage 120. The storage 120 may mainly include a storage program area and a storage data area, where the storage program area may store an operating system, at least one application needed by a function (for example, a voice playing function and an image playing function), and the storage data area may store data (for example, audio data and a telephone book) created by use of the terminal 700.

Besides, the storage 120 may include a high-speed random access memory and may also include a non-volatile memory, for example, at least one disk storage device, a flash memory device, or other volatile solid-state storage devices. Accordingly, the storage 120 may also include a storage controller for providing the processor 180 and the input unit 130 with access to the storage 120.

The input unit 130 may be configured to receive input numeral or character information, generate a signal of a keyboard, mouse, operating arm, optics or trackball related to user's setting and function control, and input the signal. Specifically, the input unit 130 may include a touch-sensitive surface 131 and other input equipment 132. The touch-sensitive surface 131, also referred to as a touch display screen or a touchpad, may collect a user's touch operation thereon or nearby (for example, a user operates on the touch-sensitive surface 131 or near the touch-sensitive surface 131 using any appropriate object or accessory such as a finger and a touch pen) and drive an corresponding connecting apparatus according to a preset program. Optionally, the touch-sensitive surface 131 may include two parts, namely, a touch detecting apparatus and a touch controller. The touch detecting apparatus detects a user's touch direction, then detects a signal caused by the touch operation, and transmits the signal to the touch controller. The touch controller receives touch information from the touch detecting apparatus, converts it into a contact coordinate, then sends the coordinate to the processor 180, and can receive a command sent from the processor 180 and execute the command.

Besides, a plurality of types such as resistor-typed, capacitor-typed, infrared, and surface acoustic waves may be used to implement the touch-sensitive surface 131. Apart from the touch-sensitive surface 131, the input unit 130 may also include another input equipment 132. Specifically, the other input equipment 132 may include but not limited to one or more of a physical keyboard, a functional key (for example, a volume control button and a switch button), a trackball, a mouse, and an operating arm.

The display unit 140 may be configured to display information input by a user or information provided to a user, and be used as various graphic user interfaces of the terminal 700. These graphic user interfaces may be composed of a graph, a text, an icon, a video, and a random combination of a text, an icon, and a video. The display unit 140 may include a display panel 141.

Optionally, modes such as an LCD (Liquid Crystal Display, liquid crystal display) and an OLED (Organic Light-Emitting Diode, organic light-emitting diode) may be used to configure the display panel 141. Furthermore, the touch-sensitive surface 131 may cover the display panel 141. After detecting a touch operation thereon or nearby, the touch-sensitive surface 131 transmits the touch operation to the processor 180, so as to determine a type of a touch event. Subsequently, the processor 180 provides a corresponding visual output on the display panel 141 according to the type of the touch event.

Although the touch-sensitive surface 131 and the display panel 141 are used as two independent components for implementing input and output functions in FIG. 9, in some examples, the touch-sensitive surface 131 and the display panel 141 may be integrated with each other to implement the input and output functions.

The terminal 700 may also include at least one sensor 150, for example, a light sensor, a motion sensor, and other sensors. Specifically, the light sensor may include an ambient light sensor and a proximity sensor. Here, the ambient light sensor may adjust luminance of the display panel 141 according to light and shade of ambient light rays.

The proximity sensor may turn off the display panel 141 and/or backlight when the terminal 700 is moved close to ears. As one of motion sensors, a gravity acceleration sensor may detect a value of an acceleration in each direction (generally, three axes are included), may detect a value and a direction of gravity in static state, and may recognize a use of a mobile phone state (for example, transverse-vertical screen switch, related games, and magnetometer state calibration) and a vibration recognition-related function (for example, a pedometer and a knock).

A case where the terminal 700 may also be configured with other sensors such as a gyroscope, a barometer, a hygrometer, a thermometer, and infrared sensor is not described in details herein.

The audio circuit 160, a loudspeaker 161, and a microphone 162 may serve as audio interfaces between a user and the terminal 700. The audio circuit 160 may transmit an electric signal which is converted from received audio data to the loudspeaker 161.

The loudspeaker 161 converts the electric signal into a voice signal and output it. In another aspect, the microphone 162 converts a collected voice signal into an electric signal. The audio circuit 160 receives the electric signal, converts it into audio data, and outputs the audio data to the processor 180 for processing. Then, the audio data is sent, for example, to another terminal by passing through the RF circuit 110, or is output to the storage 120 for further processing. The audio circuit 160 may also include an earplug jack, for providing communications between an external headset and the terminal 700.

The WiFi belongs to short-range wireless transmission technologies. The terminal 700 may help a user to receive and send e-mail, browse a page, and visit stream media through the WiFi module 170. It provides a user with wireless broadband internet access. Although the WiFi module 170 is shown in FIG. 9, it should be understood that it is not a necessary component of the terminal 700 and may completely omitted according to requirements without changing the scope of the essence of the disclosure.

The processor 180 is a control center of the terminal 700. All parts of a whole mobile phone are connected using various interfaces and lines. Software program and/or a module stored in the storage 120 are run or executed, and data stored in the storage 120 are called, to execute various functions of the terminal 700 and processing data, thereby performing overall monitoring on the mobile phone.

Optionally, the processor 180 may include one or more processing cores. Preferably, the processor 180 may be integrated of an application processor and a modem processor, where the application processor mainly processes an operating system, a user interface, and an application, and the modem processor mainly processes wireless communication. It should be understood that the modem processor also may not be integrated into the processor 180.

The terminal 700 also includes a power supply 190 (for example, a battery) for supplying power to all components. Preferably, the power supply may be logically connected to the processor 180 through a power supply management system, so that the power supply management system implements functions such as management of charging and discharging, as well as power consumption management.

The power supply 190 may also include a random assembly such as one or more direct current or alternating current power supplies, a recharging system, a power supply fault detecting circuit, a power supply converter or inverter, and a power supply state indicator.

Although it is not shown, the terminal 700 may also include a camera, a Bluetooth module, and the like, which are not described in detail again herein. Specifically, in this example, the display unit of the terminal is a touch screen display. The terminal also includes a storage and one or more programs. The one or more programs are stored in the storage and are configured to be executed by one or more processors. The one or more programs include an instruction for executing an operation as follows:

Acquiring a first original image to be processed and creating preset number copies of first original image which are the same as the first original image to be processed and have different transparencies;

Offsetting content in each copy of first original image to obtain preset number copies of first processed images; and Overlaying the first original image to be processed and the preset number copies of the first processed images and getting an overlaid image as a result of the first processed image to be processed.

Assuming that the above is a first possible implementation manner, the storage of the terminal in a second possible implementation manner provided based on the first possible implementation manner also includes an instruction for executing an operation as follows:

the overlaying the first original image to be processed and the preset number copies of the first processed images includes:

aligning and overlaying the first original image to be processed and the preset number copies of the first processed images.

The storage of the terminal in a third possible implementation manner provided based on the first possible implementation manner also includes an instruction for executing an operations as follows:

the overlaying the first original image to be processed and the preset number copies of the first processed images includes:

overlaying the first original image to be processed and the preset number copies of the first processed images according to a preset offset distance.

The storage of the terminal in a fourth possible implementation manner provided based on the first possible implementation manner also includes an instruction for executing an operation as follows:

after the using an overlaid image as a result of the processed first original image to be processed, the method also includes:

displaying the result of the processed the first original image to be processed.

The storage of the terminal in a fifth possible implementation manner provided based on the first to fourth possible implementation manners also includes an instruction for executing an operation as follows:

the overlaying the first original image to be processed and the preset number copies of the first processed images includes:

rendering the first original image to be processed into a back buffer;

multiplying content in the back buffer by a preset scale factor and storing the product to an accumulation buffer; and performing a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently storing image and original content in the accumulation buffer, and then substituting the original content in the accumulation buffer with overlaid content each time after an image is stored in the accumulation buffer until all the preset number copies of the first processed images are overlaid in the accumulation buffer to obtain an overlaid image.

The storage of the terminal in a sixth possible implementation manner provided based on the fifth possible implementation manner also includes an instruction for executing an operation as follows:

the displaying the result of the processed first original image to be processed includes:

copying content in the accumulation buffer to the back buffer, multiplying content in the back buffer by a preset coefficient, exchanging the product to a front buffer, and displaying content in the front buffer.

The storage of the terminal in a seventh possible implementation manner provided based on the first possible implementation manner also includes an instruction for executing an operation as follows:

processing a second original image to be processed according to the manner for the processed first original image to be processed, to obtain a result of the processed second original image to be processed; and after a preset frame interval, updating the result of the first original image according to the result of the second original image.

To sum up, through the terminal provided by the example of the present disclosure, the calculation process is simplified and the image processing speed is increased by acquiring a first original image to be processed, creating preset number copies of first original image which are the same as the first original image to be processed and have different transparencies, then offsetting content in each copy of the first original image to obtain preset number copies of first processed images, and subsequently overlaying the first original image to be processed and the preset number copies of the first processed images. Besides, the use range is enlarged since the technical solution provided by the example of the present disclosure is also suitable for Android systems.

In addition, fluent visual effects are achieved by displaying the result of processing the first original image to be processed, processing the second original image to be processed according to the manner and steps for processing the first original image to be processed to obtain a result of the processed second original image to be processed, and after a preset frame interval, updating the result of the first original image according to the result of the second original image.

An example of the present disclosure also provides a computer readable storage medium. The computer readable storage medium may be a computer readable storage medium included in the storage of the above example, and may also exist independently, as a computer readable storage medium which is not mounted in a terminal. The computer readable storage medium stores one or more programs. The one or more programs are used by one or more processors for executing a method for processing an image. The method includes:

acquiring a first original image to be processed and creating preset number copies of first original image which are the same as the first original image to be processed and have different transparencies;

offsetting content in each copy of the first original image to obtain preset number copies of first processed images; and overlaying the first original image to be processed and the preset number copies of the first processed images and getting an overlaid image as a result of processing the first original image to be processed.

Assuming that the above is a first possible implementation manner, the storage of the terminal in a second possible implementation manner provided based on the first possible implementation manner also includes an instruction for executing an operation as follows:

the overlaying the first original image to be processed and the preset number copies of the first processed images includes:

aligning and overlaying, or aligning to overlay the first original image to be processed and the preset number copies of the first processed images.

The storage of the terminal in a third possible implementation manner provided based on the first possible implementation manner also includes an instruction for executing an operation as follows:

the overlaying the first original image to be processed and the preset number copies of the first processed images includes:

overlaying the first original image to be processed and the preset number copies of the first processed images according to a preset offset distance.

The storage of the terminal in a fourth possible implementation manner provided based on the first possible implementation manner also includes an instruction for executing an operation as follows:

after the using an overlaid image as a result of processing the first original image to be processed, the method also includes:

displaying the result of the processed first original image to be processed.

The storage of the terminal in a fifth possible implementation manner provided based on the first to fourth possible implementation manners also includes an instruction for executing an operation as follows:

the overlaying the first original image to be processed and the preset number copies of the first processed images includes:

rendering the first original image to be processed into a back buffer;

multiplying content in the back buffer by a preset scale factor and storing the product to an accumulation buffer; and performing a process of rendering the preset number copies of the first processed images into the back buffer sequentially according to the transparencies, multiplying content in the back buffer by the preset scale factor and storing the product to the accumulation buffer each time after a copy of the first original image is rendered, and overlaying a currently storing image and original content in the accumulation buffer, and then substituting the original content in the accumulation buffer with overlaid content each time after an image is stored in the accumulation buffer until all the preset number copies of the first processed images are overlaid in the accumulation buffer to obtain an overlaid image.

The storage of the terminal in a sixth possible implementation manner provided based on the fifth possible implementation manner also includes an instruction for executing an operation as follows:

the displaying the result of processing the first original image to be processed includes:

Copying content in the accumulation buffer to the back buffer, multiplying content in the back buffer by a preset coefficient, exchanging the product to a front buffer, and displaying content in the front buffer.

The storage of the terminal in a seventh possible implementation manner provided based on the first possible implementation manner also includes instructions for executing operations as follows:

Processing a second original image to be processed according to the manner and steps for processing the first original image to be processed, to obtain a result of the processed second original image to be processed; and after a preset frame interval, updating the result of the first original image according to the result of the second original image.

To sum up, through the terminal provided by the example of the present disclosure, the calculation process is simplified and the image processing speed is increased by acquiring a first original image to be processed, creating preset number copies of first original image which are the same as the first original image to be processed and have different transparencies, then offsetting content in each copy of the first original image to obtain preset number copies of first processed images, and subsequently overlaying the first original image to be processed and the preset number copies of the first processed images. Besides, the use range is enlarged since the technical solution provided by the example of the present disclosure is also suitable for Android systems.

In addition, fluent visual effects are achieved by displaying the result of processing the first original image to be processed, processing the second original image to be processed according to the manner for processing the first original image to be processed to obtain a result of the processed second original image to be processed, and after a preset frame interval, updating the result of the first original image according to the result of the second original image.

An example of the present disclosure provides a graphic user interface. The graphic user interface is used in a terminal. The terminal includes a touch screen display, a storage, and one or more processors for executing one or more programs. The graphic user interface is configured to:

acquire a first original image to be processed and create preset number copies of first original image which are the same as the first original image to be processed and have different transparencies;

offset content in each copy of the first original image to obtain preset number copies of first processed images; and overlay the first original image to be processed and the preset number copies of the first processed images and get an overlaid image as a result of processing the first original image to be processed.

To sum up, through the graphic user interface provided by the example of the present disclosure, the calculation process is simplified and the image processing speed is increased by acquiring a first original image to be processed, creating preset number copies of first original image which are the same as the first original image to be processed and have different transparencies, then offsetting content in each copy of the first original image to obtain preset number copies of first processed images, and subsequently overlaying the first original image to be processed and the preset number copies of the first processed images. Besides, the use range is enlarged since the technical solution provided by the example of the present disclosure is also suitable for Android systems.

It should be noted that: while processing an image, the apparatus for processing an image provided in the examples is merely described by using the division of all the functional modules for examples. In an actual application, the functions may be allocated to be implemented by different functional modules, that is, the internal structure of the apparatus may be divided into different functional modules to implement to all or some of the above described functions. In addition, the method and apparatus for processing an image that are provided in the examples belong to one same conception, where the detailed implementation process may be referred to in the process examples, which is not described in detail herein.

The sequence numbers of the examples of the present disclosure are merely for description purpose but do not indicate the preference of the examples.

A person of ordinary skill in the art may understand that all or a part of the steps of the examples may be implemented through hardware, or may be implemented by a program instructing relevant hardware. The program may be stored in a computer readable storage medium. The computer readable storage medium may be either transitory or non-transitory. The storage medium mentioned above may be a read-only memory, a magnetic disk, or an optical disk.

The foregoing descriptions are merely exemplary examples of the present disclosure, but are not intended to limit the present disclosure. Any modification, equivalent replacement, or improvement derived within the spirit and principle of the present disclosure should fall within the protection scope of the present disclosure.

What is claimed is:

1. A method for processing an image, comprising:
acquiring, by a terminal comprising a memory and a processor in communication with the memory, an original image having an original transparency, where the original transparency is 1;
creating, by the terminal, a first clone image having a first clone transparency, where:
the first clone image has a same image as the original image, and
the first clone transparency is smaller than the original transparency;
offsetting, by the terminal, content of the first clone image along a first direction by a first offset distance to obtain a first offset clone image;
rendering, by the terminal, the original image into a back buffer;
multiplying, by the terminal, content in the back buffer by a preset scale factor;
storing, by the terminal, the multiplied content to an accumulation buffer;
rendering, by the terminal, the first clone image into the back buffer;
multiplying, by the terminal, content in the back buffer by the preset scale factor; and
overlaying, by the terminal, the multiplied content in the back buffer and the content in the accumulation buffer to obtain a first overlaid image.

2. The method according to claim 1, wherein the offsetting the content of the first clone image along the first direction by the first offset distance to obtain the first offset clone image further comprises:
when a corresponding no-content area of the first offset clone image appears in an image display range, colorless filling, by the terminal, the corresponding no-content area.

3. The method according to claim 1, wherein the overlaying the original image and the first offset clone image to obtain the first overlaid image comprises:
aligning, by the terminal, the original image and the first offset clone image; and
overlaying, by the terminal, the original image and the first offset clone image to obtain the first overlaid image.

4. The method according to claim 1, further comprising:
copying, by the terminal, the content in the accumulation buffer to the back buffer;
multiplying, by the terminal, the content in the back buffer by a preset coefficient;
exchanging, by the terminal, the multiplied content to a front buffer; and
displaying, by the terminal, the content in the front buffer.

5. The method according to claim 1, further comprising:
creating, by the terminal, a second clone image having a second clone transparency, where:
the second clone image has a same image as the original image, and
the second clone transparency is smaller than the original transparency;
offsetting, by the terminal, content of the second clone image along a second direction by a second offset distance to obtain a second offset clone image; and overlaying, by the terminal, the first overlaid image and the second offset clone image having the second clone transparency to obtain a second overlaid image.

6. The method according to claim 5, wherein:
the second clone transparency is same as the first clone transparency;
the second direction is opposite to the first direction; and
the second offset distance is same as the first offset distance.

7. The method according to claim 5, wherein:
the second clone transparency is smaller than the first clone transparency;
the second direction is same as the first direction; and
the second offset distance is larger than the first offset distance.

8. The method according to claim 7, wherein:
the second offset distance is equal to twice of the first offset distance.

9. A device for processing an image, comprising:
a memory storing instructions; and
a processor in communication with the memory, wherein, when the processor executes the instructions, the instructions are configured to cause the device to:
acquire an original image having an original transparency, where the original transparency is 1,
create a first clone image having a first clone transparency, where:
the first clone image has a same image as the original image, and
the first clone transparency is smaller than the original transparency,
offset content of the first clone image along a first direction by a first offset distance to obtain a first offset clone image,
render the original image into a back buffer,
multiply content in the back buffer by a preset scale factor,
store the multiplied content to an accumulation buffer,
render the first clone image into the back buffer,
multiply content in the back buffer by the preset scale factor, and
overlay the multiplied content in the back buffer and the content in the accumulation buffer to obtain a first overlaid image.

10. The device according to claim 9, wherein, when the instructions are configured to cause the device to offset the content of the first clone image along the first direction by the first offset distance to obtain the first offset clone image, the instructions are further configured to cause the device to:
when a corresponding no-content area of the first offset clone image appears in an image display range, colorless fill the corresponding no-content area.

11. The device according to claim 9, wherein, when the instructions are configured to cause the device to overlay the original image and the first offset clone image to obtain the first overlaid image, the instructions are configured to cause the device to:
align the original image and the first offset clone image; and
overlay the original image and the first offset clone image to obtain the first overlaid image.

12. The device according to claim 9, wherein, when the processor executes the instructions, the instructions are further configured to cause the device to:
copy the content in the accumulation buffer to the back buffer;
multiply the content in the back buffer by a preset coefficient;
exchange the multiplied content to a front buffer; and
display the content in the front buffer.

13. The device according to claim 9, wherein, when the processor executes the instructions, the instructions are further configured to cause the device to:
create a second clone image having a second clone transparency, where:
the second clone image has a same image as the original image, and
the second clone transparency is smaller than the original transparency;
offset content of the second clone image along a second direction by a second offset distance to obtain a second offset clone image; and
overlay the first overlaid image and the second offset clone image having the second clone transparency to obtain an second overlaid image.

14. The device according to claim 13, wherein:
the second clone transparency is same as the first clone transparency;
the second direction is opposite to the first direction; and
the second offset distance is same as the first offset distance.

15. The device according to claim 13, wherein:
the second clone transparency is smaller than the first clone transparency;
the second direction is same as the first direction; and
the second offset distance is larger than the first offset distance.

16. The device according to claim 15, wherein:
the second offset distance is equal to twice of the first offset distance.

17. A non-transitory computer readable storage medium storing instructions, the instructions, when executed by a processor, causing the processor to perform:
acquiring an original image having an original transparency, where the original transparency is 1;
creating a first clone image having a first clone transparency, where:
the first clone image has a same image as the original image, and
the first clone transparency is smaller than the original transparency;
offsetting content of the first clone image along a first direction by a first offset distance to obtain a first offset clone image;
rendering the original image into a back buffer;
multiplying content in the back buffer by a preset scale factor;
storing the multiplied content to an accumulation buffer;
rendering the first clone image into the back buffer;
multiplying content in the back buffer by the preset scale factor; and
overlaying the multiplied content in the back buffer and the content in the accumulation buffer to obtain a first overlaid image.

18. The non-transitory computer readable storage medium according to claim 17, wherein, when the instructions cause the processor to perform the offsetting the content of the first clone image along the first direction by the first offset distance to obtain the first offset clone image, the instructions further cause the processor to perform:

when a corresponding no-content area of the first offset clone image appears in an image display range, colorless filling the corresponding no-content area.

* * * * *